(12) United States Patent
Dwight et al.

(10) Patent No.: US 8,537,993 B2
(45) Date of Patent: Sep. 17, 2013

(54) TELEPHONE NUMBER MAPPING

(75) Inventors: Timothy M. Dwight, Richardson, TX (US); Priscilla Lau, Fremont, CA (US); Paul Schneeloch, Gettysburg, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 943 days.

(21) Appl. No.: 12/640,120

(22) Filed: Dec. 17, 2009

(65) Prior Publication Data

US 2011/0150196 A1  Jun. 23, 2011

(51) Int. Cl.
*H04M 1/56* (2006.01)
(52) U.S. Cl.
USPC ................................... 379/142.04
(58) Field of Classification Search
USPC ................................... 379/142.04
See application file for complete search history.

(56) References Cited

U.S. PATENT DOCUMENTS

| 2007/0097999 A1* | 5/2007 | Yan | 370/410 |
| 2007/0243876 A1* | 10/2007 | Duan | 455/445 |
| 2008/0075114 A1* | 3/2008 | Mo | 370/466 |

\* cited by examiner

*Primary Examiner* — Simon Sing (57) ABSTRACT

A method may include receiving a telephone number mapping query associated with a call from a calling party to a called party. The method may also include identifying, based on the query, first routing information that identifies a call session control component to process the call, and second routing information that identifies a border control component. The method may further include forwarding the first routing information to the querying device, and forwarding the second routing information to the querying device when the query originated from outside a network servicing the called party.

20 Claims, 5 Drawing Sheets

TELEPHONE NUMBER MAPPING

BACKGROUND INFORMATION

Routing calls through networks has become increasingly complex. For example, service providers must perform a number of lookups and make routing decisions based on results of the lookups. Such lookups and routing decisions typically consume a significant amount of network resources. In addition, processing calls originating from the home network of the called party and processing calls originating from an external network may require different handling. This different handling often adds to the complexity of call processing and signaling.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to telephone number mapping used to identify an appropriate network element to handle a call. In one implementation, if a call originates from outside a service provider's network, a query to a telephone number mapping system may identify a call session control function element to which the call will be forwarded, as well as a border control function element to process the call prior to forwarding the call to the call session control function element. The border control function element may perform security-related processing for the outside call prior to forwarding the call.

Figure 1:
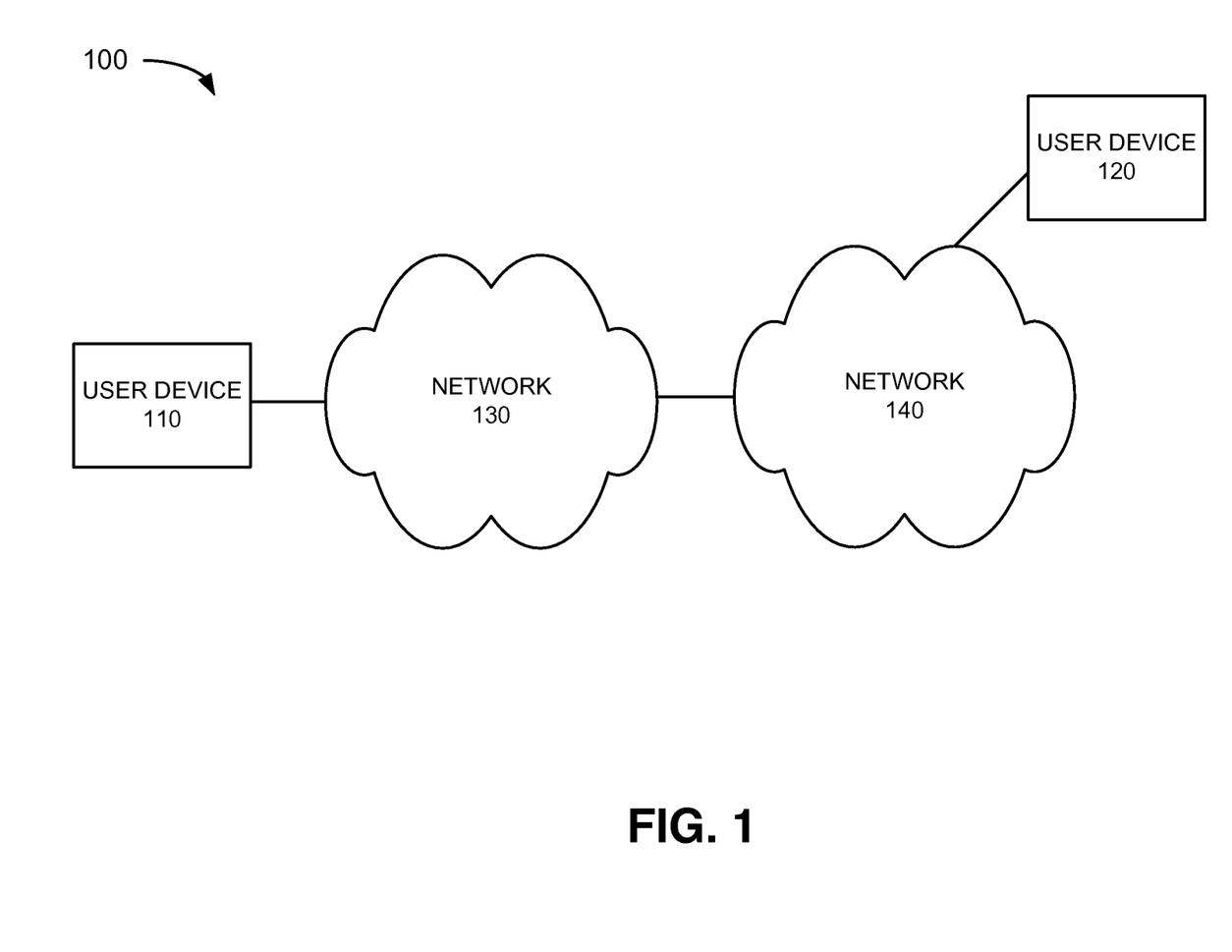
FIG. 1 illustrates an exemplary network in which systems and methods described herein may be implemented.

FIG. 1 is a block diagram of an exemplary network 100 in which systems and methods described herein may be implemented. Network 100 may include user device 110, user device 120, network 130 and network 140.

User devices 110 and 120 may each include any type of device that is able to transmit and receive data, such as text data, video data, image data, audio data, multi-media data, etc. For example, user device 110 may include some type of computer, such as a personal computer (PC), a laptop computer, etc., a personal digital assistant (PDA), a web-based appliance, a mobile terminal (e.g., a cellular telephone), etc. User devices 110 and 120 may also each include a telephone, such as a public switched telephone network (PSTN) based telephone, an Internet-protocol (IP) based phone, a wireless telephone, etc., used to make and receive telephone calls.

Networks 130 and 140 may each include one or more wired, wireless and/or optical networks that are capable of receiving and transmitting data, voice and/or video signals, including multi-media signals that include voice, data and video information. For example, network 130 and network 140 may each include one or more public switched telephone networks (PSTNs) or other type of switched network. Network 130 and/or network 140 may also include one or more wireless networks and may include a number of transmission towers for receiving wireless signals and forwarding the wireless signals toward the intended destinations. Network 130 and/or network 140 may further include one or more satellite networks, one or more packet switched networks, such as an IP-based network, a local area network (LAN), a wide area network (WAN), a personal area network (PAN) (e.g., a wireless PAN), an intranet, the Internet, or another type of network that is capable of transmitting data.

In an exemplary implementation, network 140 may represent a network associated with a service provider that provides various services, such as Internet-protocol (IP) related services, value added services, etc. For example, in one implementation, network 140 may represent an Internet Protocol Multimedia Subsystem (IMS) network that provides services to IMS subscribers (referred to herein as subscribers), and network 130 may represent any network or portion of a network that is not affiliated with the service provider associated with network 140.

The exemplary configuration illustrated in FIG. 1 is provided for simplicity. It should be understood that a typical network may include more or fewer devices than illustrated in FIG. 1. For example, two user devices 110 and 120 and two networks 130 and 140 are shown for simplicity. It should be understood that network 100 may include a large number (e.g., hundreds or thousands) of user devices and a number of other networks. Network 100 may also include additional elements, such as switches, routers, gateways, backend systems, etc., that aid in routing calls and/or information in network 100 and providing services to parties associated with user devices 110/120.

Figure 2:
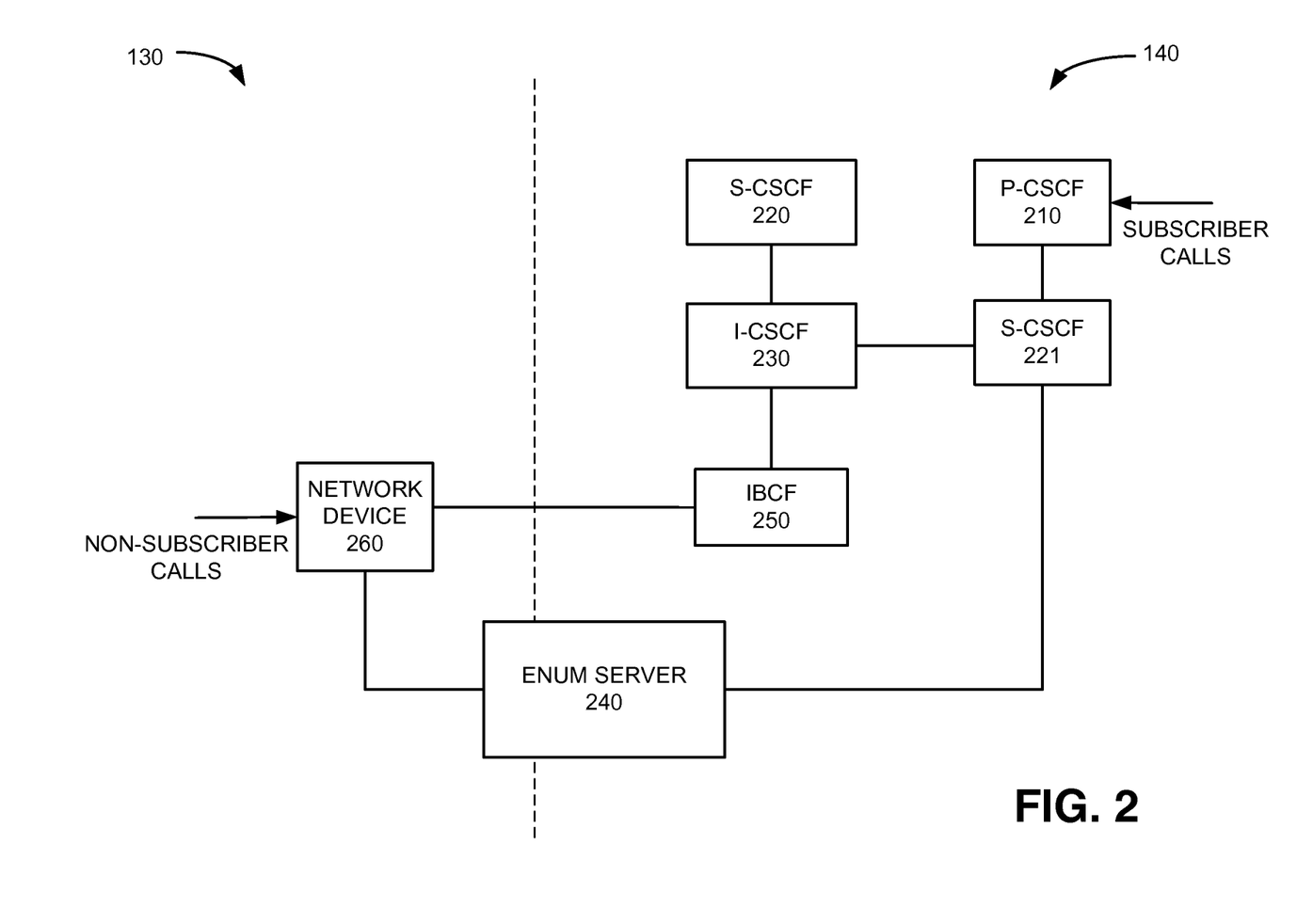
FIG. 2 illustrates exemplary components included in the network of FIG. 1.

FIG. 2 illustrates a portion of networks 130 and 140 consistent with implementations described herein. As described above, in an exemplary implementation, network 140 may include an IMS network that provides mobile and fixed users with multimedia services. For example, the IMS may provide voice over Internet protocol (VoIP) related processing of calls for VoIP users, such as a caller at user device 110 and/or user device 120. Referring to FIG. 2, networks 130 and 140 are shown separated by the dotted line.

Network 140 may include call session control components used to process calls in network 140 (e.g., calls to/from IMS subscribers). For example, network 140 may include proxy call session control function (P-CSCF) 210, serving call session control function (S-CSCF) 220, S-CSCF 221 and interrogating call session control function (I-CSCF) 230. Network 140 may also include ENUM server 240 and interconnect border control function (IBCF) 250. It should be understood that network 140 may include additional elements that aid in routing calls and providing services to customers. In addition, functions described as being performed by one of the elements in FIG. 2 may alternatively be performed by another element or multiple elements. In addition, although the various devices illustrated in FIG. 2 are shown as separate devices, in other implementations, the functions performed by two or more of these devices may be performed by a single device or platform. Still further, additional connections (not shown) between the components of FIG. 2 may exist.

P-CSCF 210, S-CSCF 220, S-CSCF 221 and I-CSCF 230 may perform session control processing and may be responsible for parsing a session (e.g., a session initiation protocol (SIP) session) and applying logic (e.g., business logic, service logic, operational logic, etc.) on a per call or per event basis. The outcome of the session control processing may be to route call data to the appropriate components and/or append SIP headers and values to the call data.

In an exemplary implementation, P-CSCF 210, S-CSCF 220, S-CSCF 221 and I-CSCF 230 may be implemented in a single device. Alternatively, P-CSCF 210, S-CSCF 220, S-CSCF 221 and I-CSCF 230 may be implemented using separate network elements/devices. In one implementation, S-CSCFs 220 and 221 may be viewed as the brain of the call session control components (i.e., P-CSCF 210, S-CSCFs 220 and 221 and I-CSCF 230). The call session control components may also interact with a home subscriber server (HSS) (not shown) and/or other elements associated with providing IMS related services.

P-CSCF 210 may act as the main point of contact for connections to subscribers of the IMS (referred to herein as subscribers or IMS subscribers). For example, P-CSCF 210 may validate requests from subscribers, forward the requests to selected destinations, process and forward the responses, etc. P-CSCF 210 may also generate chargeable events and send information relating to the chargeable events to billing system (not shown).

S-CSCFs 220 and 221 may perform session control and registration services for the users of the IMS network/platform (e.g., network 140). S-CSCF 220 and/or S-CSCF 221 may receive a user profile from another device, such as a home subscriber server (HSS) (not shown in FIG. 2) and route sessions requested by a subscriber. Additionally, S-CSCF 220 and/or S-CSCF 221 may perform user authentication for subscribers.

I-CSCF 230 may act as the main point of contact for connections to subscribers served by other networks, such as other IP networks (e.g., network 130). I-CSCF 230 may function to identify the S-CSCF that serves the called party. I-CSCF 230 may perform this function for both internally generated calls (e.g., subscriber calls) and for externally generated calls (e.g., non-subscriber calls). For example, S-CSCF 221 may receive a subscriber call forwarded via P-CSCF 210, generate an ENUM query to ENUM server 240 and receive a response identifying I-CSCF 230. S-CSCF 221 may forward the call to I-CSCF 230. I-CSCF 230 may perform an HSS query and identify, for example, S-CSCF 220 as the CSCF component serving the called party and forward the call to S-CSCF 220. In an exemplary implementation, I-CSCF 230 may receive SIP messages and identify the next hops for the SIP messages. To accomplish this, I-CSCF 230 may query an HSS for the location (e.g., an address) of the appropriate S-CSCF to which a particular SIP message is to be forwarded. For example, the HSS may include one or more servers that act as the central repository for user-related information. I-CSCF 230 may access the HSS, as described above, to identify the location of a particular S-CSCF component serving the called party.

ENUM server 240 may perform processing associated with performing E.164 number mapping (ENUM), such as mapping a called telephone number to a fully qualified domain name (FQDN) of a resource to which the call should be forwarded. E.164 is an International Telecommunication Union telecommunication (ITU-T) standard which defines the international public telecommunication numbering plan used in the PSTN and other data networks. The FQDN may specify an exact location in the domain name system (DNS) hierarchy. That is, the FQDN may specify all domain levels of the resource, including the top level domain name relative to the root domain. ENUM server 240 may receive queries associated with calls from a network element (e.g., S-CSCF 221) associated with network 140, as well as a network element (e.g., network device 260) in an external network (e.g., network 130), and return an FQDN of the network element or set of network elements providing the I-CSCF for the called telephone number. In instances where the call came from outside network 140, ENUM server 240 may also provide the FQDN of an IBCF to which the querying device should forward the call, as described in more detail below. ENUM server 240 is shown in FIG. 2 as straddling the line between networks 130 and 140 since ENUM server 240 is directly accessible to devices in both networks 130 and 140. However, in an exemplary implementation, ENUM 240 server may be part of network 140.

IBCF 250 may represent one or more session border controllers (SBCs) that provide control of the boundary between different service provider networks, such as networks 130 and 140. In an exemplary implementation, IBCF 250 may provide signaling protocol inter-working between an IP-based (e.g., SIP-based) platform associated with network 140 and other service provider networks (e.g., network 130), as well as control the transport boundary between service provider networks. For example, IBCF 250 may provide SIP-aware firewall capabilities that support network address translation (NAT), prevent denial of service (DoS) attacks, and execute other security enforcement and/or control features, as described in more detail below.

Network device 260 may be included in network 130 and may represent any network device that may forward a call to another network, such as network 140, or may generate an ENUM query to, for example, ENUM server 240, to determine the next hop address (e.g., where to forward the call) in order to reach the intended destination which may be identified by the called telephone number. For example, network device 260 may represent a call forwarding device in network 130 (e.g., a soft switch, router, gateway or some other device designed to handle VoIP calls) and may generate an ENUM query to ENUM server 240. In an exemplary implementation, the call may be a call originating or being forwarded via network 130 to a subscriber associated with network 140. Calls from outside network 140 may be treated differently than calls from within network 140, as described in more detail below.

Figure 3:
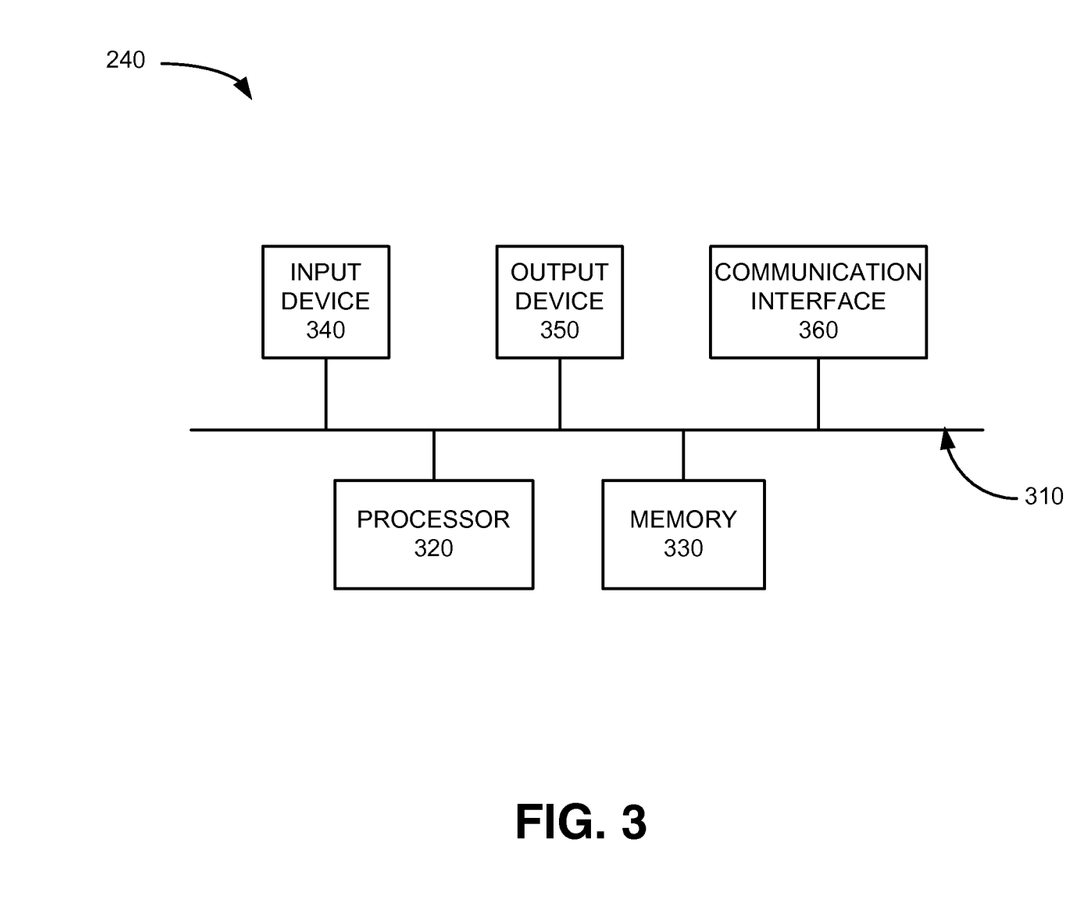
FIG. 3 illustrates an exemplary configuration of one or more of the components of FIG. 2.

FIG. 3 illustrates an exemplary configuration of ENUM server 240. Other devices in network 100, such as I-CSCF 230, IBCF 250 and network device 260, may be configured in a similar manner. Referring to FIG. 3, ENUM server 240 may include bus 310, processor 320, memory 330, input device 340, output device 350 and communication interface 360. Bus 310 may include a path that permits communication among the elements of ENUM server 240.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to ENUM server 240, such as a keyboard, a keypad, a mouse, a pen, a microphone, a touch screen, voice recognition and/or biometric mechanisms, etc. Output device 350 may include a mechanism that outputs information to the user, including a display, a printer, a speaker, etc.

Communication interface 360 may include any transceiver that ENUM server 240 may use to communicate with other devices (e.g., S-CSCF 220/221, I-CSCF 230, IBCF 250, network device 260, etc.) via wired, wireless or optical mechanisms. Communication interface 360 may also include one or more radio frequency (RF) transmitters, receivers and/or transceivers and one or more antennas for transmitting and receiving RF data via network 130 and/or 140. Communication interface 360 may also include a modem or an Ethernet interface to a LAN or other mechanisms for communicating with elements in a network, such as network 140 or another network (e.g., network 130).

The exemplary configuration illustrated in FIG. 3 is provided for simplicity. It should be understood that ENUM server 240 (and I-CSCF 230, IBCF 250) may include more or fewer devices than illustrated in FIG. 3. In an exemplary implementation, ENUM server 240 may perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
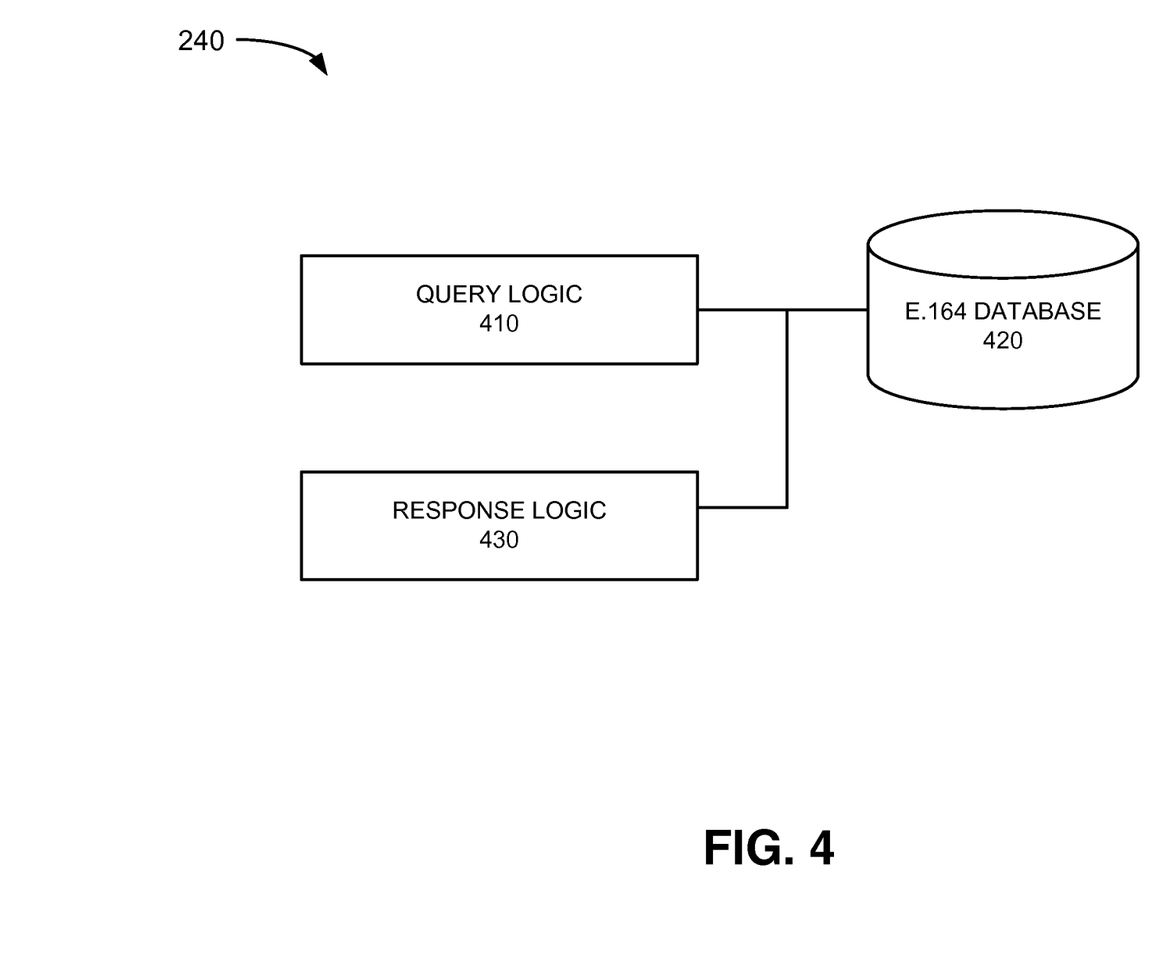
FIG. 4 illustrates an exemplary configuration of logic components implemented in the device of FIG. 3.

FIG. 4 is an exemplary functional block diagram of ENUM server 240 according to an exemplary implementation. The logical blocks illustrated in FIG. 4 may be implemented in software, hardware, or a combination of hardware and software. For example, in one implementation, all or some of the logical blocks illustrated in FIG. 4 may be implemented by processor 320 (FIG. 3) executing software instructions stored in, for example, memory 330.

Referring to FIG. 4, ENUM server may include query logic 410, E.164 database 420 and response logic 430. Query logic 410 may receive queries from various devices, such as network device 260, which may be outside the network in which ENUM server 240 resides, an S-CSCF 220/221 that may reside on the same network as ENUM server 240, etc. Each of these devices may request routing information associated with the called party telephone number so that the querying device may forward the call to the next hop toward the intended destination that may be identified by the called telephone number. Query logic 410 may access E.164 database 420 and provide, for example, an FQDN identifying a network element to which a call intended for a particular called number should be forwarded. Query logic 410 may also determine whether a call originated from the home network (e.g., network 140) or an external network (e.g., network 130). For example, query logic 410 may check the source IP address and/or the destination IP address (or port numbers) in the ENUM query. Query logic 410 may be provisioned with source IP addresses that may be used by any querying network elements within the same network, so that query logic 410 can differentiate ENUM queries from the home network or from an external network. Query logic 410 may also use different IP addresses (or IP port numbers) to receive ENUM queries, so that different IP addresses (or IP port numbers) may be used by the network element within the home network, such as S-CSCF 221 in network 140, and by network element outside of network 140, such as network device 260 in network 130. Determining whether the querying network element is in the home network or outside the home network may allow the ENUM server 240 to determine if the call originated on the home network or outside the home network. ENUM server 240 may return different responses to the querying device based on where the query originated, which may affect subsequent routing, as described in detail below.

E.164 database 420 may store FQDNs and/or other information identifying locations to which calls should be forwarded. For example, E.164 database 420 may store telephone numbers and locations of I-CSCF and/or IBCF components associated with the telephone numbers. In an exemplary implementation, querying logic 410 may access E.164 database 420 and retrieve information identifying both an I-CSCF and an IBCF to which a call should be forwarded, as described in more detail below.

Response logic 430 may include logic for forwarding responses to queries to the appropriate devices. For example, response logic 430 may return a string that identifies an I-CSCF address and IBCF address for the called telephone number to network device 260 when the call originated outside of network 140. Alternatively, response logic 430 may return only the I-CSCF address to S-CSCF 221 when the call originated inside network 140. In each case, E.164 database 420 may be configured by a service provider associated with network 140 to store information identifying a network control/security device, such as IBCF 250. When a call is received from outside network 140, the call may be forwarded to the identified IBCF for processing prior to forwarding the call to other functions (e.g., I-CSCF 230) within network 140, as described in more detail below.

Figure 5:
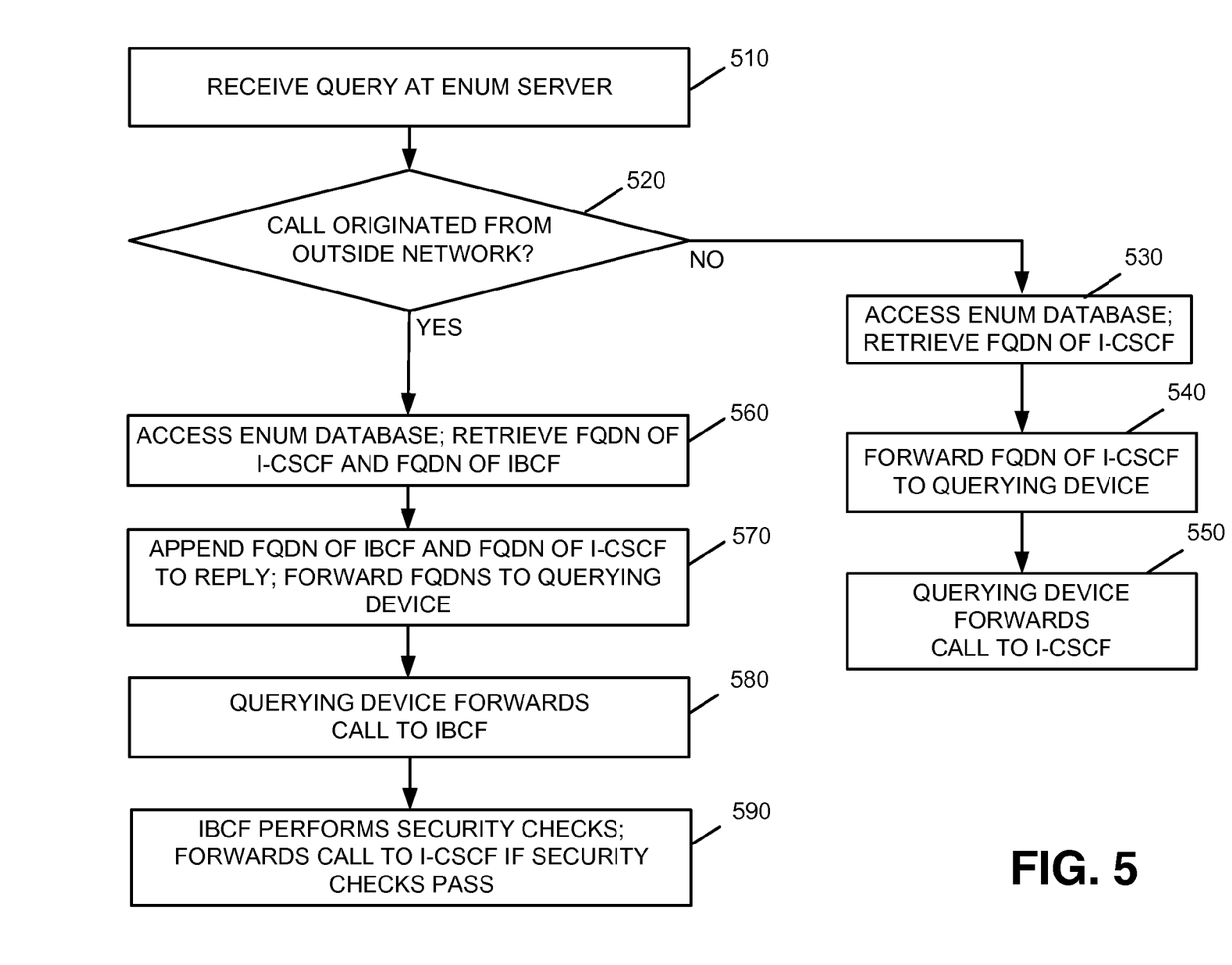
FIG. 5 is a flow diagram illustrating exemplary processing associated with the components of FIG. 2.

FIG. 5 is a flow diagram illustrating exemplary processing associated with network 100. Processing may begin with ENUM server 240 receiving a query (act 510). For example, ENUM server 240 may receive a query associated with a call forwarded to network device 260 via network 130. As an example, user device 110 (FIG. 1) may be a mobile telephone or VoIP telephone that is served by a service provider not affiliated with network 140 and a call from user device 110 intended for user device 120 may be forwarded to network device 260. Network device 260 may generate an ENUM query to ENUM server 240. As another example, another user (not shown in FIG. 1) may make a call via P-CSCF 210 and S-CSCF 221 to user device 120, with both user devices being served by network 140 (e.g., an intra-network call). In this case, ENUM server 240 may receive a query from S-CSCF 221.

In each case, query logic 410 may receive the query which includes the destination telephone number for the call. In some implementations, the query will not include the calling party telephone number. Query logic 410 may determine if the call associated with the query was initiated from a caller outside network 140 (act 520). For example, query logic 410 may determine whether the source of the query to ENUM server 240 was a device included within network 140 (e.g., S-CSCF 221) or from a device located outside network 140 (e.g., network device 260). In one exemplary implementation, query logic 410 may make the determination regarding whether the source of the query was from a device located inside/outside network 140 based on source information (e.g., a source IP address) included in the ENUM request. As described above, in some implementations, query logic 410 may set up separate IP addresses (or IP port numbers) to receive ENUM queries from a device located inside network 140 and from a device located outside network 140.

If the call originated from a device/subscriber within network 140 (act 520—no), query logic 410 may access E.164 database 420 and retrieve the FQDN of the network element or set of network elements providing the I-CSCF processing for the called telephone number (act 530). In this example, assume that E.164 database 420 stores information indicating that I-CSCF 230 is the interrogating call session control function element/device associated with the called telephone number and E.164 database 420 may store the FQDN associated with I-CSCF 230 in an entry associated with the called telephone number.

Response logic 430 may then forward a response to S-CSCF 221 that includes the FQDN of the I-CSCF to which the call should be forwarded (act 540). For example, response logic 430 may return the FQDN of I-CSCF 230 to the querying device, but not include the FQDN of any session border control function element. The querying device (e.g., S-CSCF 221) may then forward the call to I-CSCF 230 (act 550).

If, however, the call initiated from outside the network serving the called telephone number (act 520—yes), query logic 410 may access E.164 database 420 and retrieve the FQDN of an IBCF through which the querying network device should forward the call, along with the FQDN of the I-CSCF for the called number (act 560). As described above, E.164 database 420 may store the FQDN of a session border control element associated with the called telephone number. For example, a service provider associated with network 140 may store information identifying FQDNs of session border control (SBC) elements that may be used to process calls to called telephone numbers in situations where the calls originated from outside network 140. The particular border control elements servicing the called telephone numbers may be based, for example, on a location associated with the called telephone number. Query logic 410 may retrieve the FQDN of the SBC component corresponding to the call, along with the FQDN of the I-CSCF that will handle the call processing. In this example, assume that query logic 410 retrieves the FQDN of IBCF 250.

Continuing with this example, assume that a call from user device 110 and intended for user device 120 was received. In this case, further assume that E.164 database 420 stores information identifying I-CSCF 230 as the call session control function element designed to process calls to user device 120. In this case, query logic 410 may retrieve the FQDNs of I-CSCF 230 and IBCF 250.

Query logic 410 may append the FQDNs of I-CSCF 230 and IBCF 250 and generate a reply to the query that includes both FQDNs (act 570). Response logic 430 may then forward a response to the query from network device 260 that includes the FQDN of IBCF 250 and the FQDN of I-CSCF 230 (act 570).

Network device 260 may receive the response from ENUM server 240 and forward the call request to IBCF 250 (act 580). For example, in one implementation, the querying device (e.g., network device 260) may include address information identifying IBCF 250 in a SIP ROUTE header of a SIP message forwarded to network 140. The information identifying I-CSCF 230 may also be included in the SIP ROUTE header. In each case, network device 260 may forward the call to IBCF 250 prior to the call being forwarded to I-CSCF 230. In this manner, if IBCF 250 determines that the call should not be forwarded, the call may be dropped without further processing in network 100.

For example, IBCF 250 may perform various security related processing associated with the call to determine whether the call should be forwarded or blocked (act 590). As an example, IBCF 250 may determine whether the call may be associated with some type of attack (e.g., a DoS attack), determine whether the call is from a party blocked from accessing the called telephone number, or perform other control/security-related processing. If IBCF 250 determines that the call should be forwarded, IBCF 250 may forward the call to I-CSCF 230 that will further process the call for call termination to the called telephone number (act 590). In some implementations, I-CSCF 230 may query the HSS for the location of the S-CSCF serving the called user and forward the call to the identified S-CSCF and the S-CSCF will deliver the call to the called user via the appropriate P-CSCF.

In this manner, calls intended for a subscriber in network 140 are handled in a similar manner regardless of whether the calls originated from a caller served by network 140 or another network. That is, an ENUM server (e.g., ENUM server 240) may be queried by network elements located inside or outside network 140, and logic located at the ENUM server determines a next destination for the call (e.g., an I-CSCF or an IBCF) based on where the call originated. This simplifies processing associated with the service provider of network 140. That is, calls from within network 140 and outside network 140 will generate a query to an ENUM server at the home network of the called party, which then identifies the appropriate routing information. This may reduce signaling within a service provider's network and allow the service provider to not have separate ENUM databases for calls from callers (e.g., subscribers) served by the home network and callers served by another network.

Implementations described herein provide for handling calls from within a network and outside a network in a similar manner using a same database that includes routing information. This may allow for efficient utilization and provisioning of resources by generating different routing behavior without the provisioning of additional databases.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, an ENUM server was described as performing the lookup to an ENUM database, as well as determining whether the call originated from an external network. In other implementations, another device or separate devices may perform these tasks.

In addition, features have been described above with respect to an ENUM server forwarding replies to querying devices that include FQDNs of network elements. In other implementations, other address identifying information (e.g., uniform resource identifies) may be provided to querying devices.

In addition, implementations described above refer to networks 130 and 140 being associated with different service providers. In other implementations, networks 130 and 140 may represent different entities, such as different business units or sub-networks within a single company's network. In still other implementations, network 130 may represent a company's network being managed by the service provider associated with network 140. In each case, calls between the different business units and/or companies may be processed in a similar manner as that described above with respect to FIG. 5.

In addition, while series of acts have been described with respect to FIG. 5, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving a telephone number mapping query from a querying device, the telephone number mapping query being associated with a call from a calling party to a called party;
   determining whether the telephone number mapping query was initiated from a device located outside a network servicing the called party;
   identifying first routing information based on the query, the first routing information identifying an interrogating call session control function (ICSCF) component to process the call;
   identifying, in response to determining that the telephone number mapping query was initiated from a device located outside the network servicing the called party, second routing information based on the query, the second routing information identifying a border control function (BCF) component;
   forwarding the first routing information to the querying device; and
   forwarding the second routing information to the querying device.

2. The method of claim 1, further comprising:
   generating a response to the telephone number mapping query that includes both the first and second routing information in response to determining that the telephone number mapping query was initiated from a device located outside the network servicing the called party.

3. The method of claim 1, wherein the identifying first and second routing information comprises:
   accessing an E.164 number mapping (ENUM) database to identify the first and second routing information.

4. The method of claim 3, further comprising:
   storing, in the ENUM database, information identifying border control function components to which calls from outside the network servicing the called party should be forwarded.

5. The method of claim 1, wherein the identifying first routing information comprises:
   identifying a fully qualified domain name associated with the ICSCF component.

6. The method of claim 5, wherein the identifying second routing information comprises:
   identifying a fully qualified domain name associated with an interconnect border control function (IBCF) component.

7. The method of claim 6, wherein forwarding the first and second routing information comprises:
   forwarding a response that includes a fully qualified domain name for the ICSCF component and a fully qualified domain name for the IBCF component.

8. The method of claim 1, further comprising:
   forwarding, by the querying device, a session initiation protocol (SIP) message that includes the address of the BCF component in a SIP route header.

9. The method of claim 8, further comprising:
   receiving, by the BCF component, the SIP message; and
   performing, by the BCF component, security-related processing for the call.

10. The method of claim 9, further comprising:
    determining, by the BCF component, whether the call should be forwarded; and
    forwarding the call to the ICSCF component when it is determined that the call should be forwarded.

11. The method of claim 1, further comprising:
    determining whether the telephone number mapping query is associated with a call that originated within a network servicing the called party; and
    generating a response to the telephone number mapping query that does not include the second routing information in response to determining the telephone number mapping query is associated with a call that originated within the network servicing the called party.

12. A system comprising:
    a database configured to store telephone number mapping information; and
    logic configured to:
      receive a query from a querying device, the query being associated with a call from a calling party to a called party,
      determine whether the call originated from within a network servicing the called party,
      access the database to identify first routing information based on the query, the first routing information identifying a call session control function (CSCF) component to process the call,
      access the database to identify second routing information based on the query and in response to determining that the call did not originate from within the network servicing the called party, the second routing information identifying a border control function (BCF) component,
      forward the first routing information to the querying device, and
      forward the second routing information to the querying device.

13. The system of claim 12, wherein the logic is further configured to:
    not identify the second routing information in response to determining that the call originated from within the network servicing the called party.

14. The system of claim 12, wherein the database includes information identifying a plurality of fully qualified domain names of CSCF components and BCF components associated with processing calls to a plurality of telephone numbers.

15. The system of claim 14, wherein when accessing the database to identify the first and second routing information, the logic is configured to:
  identify a fully qualified domain name associated with the CSCF component, and
  identify a fully qualified domain name associated with the BCF component.

16. The system of claim 12, wherein the logic is further configured to:
  determine whether the query is associated with a subscriber to the system, and
  generate a response to the query that does not include the second routing information when the query is associated with a subscriber to the system.

17. The system of claim 12, further comprising:
  a plurality of CSCF components; and
  a plurality of BCF components,
wherein when identifying a CSCF component and a BCF component, the logic is configured to:
  identify one of the CSCF components and one of the BCF components based on a location associated with the called party.

18. A method, comprising:
  receiving a telephone number mapping query, the query being associated with a call from a calling party to a called party;
  determining whether a telephone number of the calling party corresponds to a subscriber associated with a network servicing the called party;
  identifying first routing information based on the query, the first routing information identifying a call session control component to process the call;
  identifying second routing information based on the query and in response to determining that the telephone number of the calling party does not correspond to a subscriber associated with the network servicing the called party, the second routing information identifying a border control component;
  forwarding the first routing information to the querying device; and
  forwarding the second routing information to the querying device.

19. The method of claim 18, further comprising:
  storing, in an E.164 number mapping database, information identifying border control components to which calls from outside the network servicing the called party should be forwarded.

20. The method of claim 18, further comprising:
  generating a response to the query that does not include the second routing information in response to determining that the telephone number of the calling party corresponds to a subscriber associated with the network servicing the called party.

* * * * *